(12) United States Patent
Peng et al.

(10) Patent No.: US 12,348,160 B2
(45) Date of Patent: Jul. 1, 2025

(54) EFFICIENCY OPTIMIZATION CONTROL METHOD AND SYSTEM FOR PERMANENT MAGNET SYNCHRONOUS MOTOR

(71) Applicants: Xiangtan University, Xiangtan (CN); Foshan Green Intelligent Manufacturing Research Institute Of Xiangtan University, Foshan (CN); FOSHAN SHUNDE LEPUDA MOTOR CO., LTD, Foshan (CN)

(72) Inventors: Siqi Peng, Xiangtan (CN); Weijun Li, Changsha (CN); Dan Guo, Chenzhou (CN); Hongyu Peng, Zhuzhou (CN); Hui Li, Xiangtan (CN); Pingan Tan, Xiangtan (CN)

(73) Assignees: XIANGTAN UNIVERSITY, Xiangtan (CN); FOSHAN GREEN INTELLIGENT MANUFACTURING RESEARCH INSTITUTE OF XIANGTAN UNIVERSITY, Foshan (CN); FOSHAN SHUNDE LEPUDA MOTOR CO., LTD, Foshan (CN)

( * ) Notice: Subject to any disclaimer, the term of this patent is extended or adjusted under 35 U.S.C. 154(b) by 141 days.

(21) Appl. No.: 18/239,994

(22) Filed: Aug. 30, 2023

(65) Prior Publication Data
US 2023/0412098 A1 Dec. 21, 2023

Related U.S. Application Data

(63) Continuation of application No. PCT/CN2023/090074, filed on Apr. 23, 2023.

(30) Foreign Application Priority Data

May 18, 2022 (CN) .......................... 202210542923.4

(51) Int. Cl.
H02P 21/00 (2016.01)
H02P 21/14 (2016.01)

(52) U.S. Cl.
CPC .......... *H02P 21/0003* (2013.01); *H02P 21/14* (2013.01)

(58) Field of Classification Search
CPC ... H02P 21/0003; H02P 21/14; H02P 21/0014
(Continued)

(56) References Cited

U.S. PATENT DOCUMENTS

2018/0026573 A1* 1/2018 Akashi .................... H02P 21/13
318/6
2019/0393818 A1* 12/2019 Gizinski .................. H02P 6/34
(Continued)

FOREIGN PATENT DOCUMENTS

CN 108880368 A 11/2018

*Primary Examiner* — Gabriel Agared
(74) *Attorney, Agent, or Firm* — WPAT, PC

(57) ABSTRACT

An efficiency optimization control method and system for permanent magnet synchronous motor are provided, and the method includes: step 1: obtaining an approximate optimal direct axis (d-axis) current of a permanent magnet synchronous motor by using a loss model algorithm; step 2: performing, by using the approximate optimal d-axis current as an initial value and using a deep reinforcement learning algorithm, an optimizing process on the approximate optimal d-axis current to construct an optimal deep reinforcement learning model; and step 3: inputting currently acquired state data of the permanent magnet synchronous motor into the optimal deep reinforcement learning model to obtain a control parameter value corresponding to an optimal efficiency of the permanent magnet synchronous motor, and controlling the permanent magnet synchronous motor
(Continued)

based on the control parameter value. Therefore, real-time target control for the permanent magnet synchronous motor is achieved.

14 Claims, 3 Drawing Sheets

(58) Field of Classification Search
USPC .................................................. 318/400.02
See application file for complete search history.

(56) References Cited

U.S. PATENT DOCUMENTS

| 2021/0116888 A1* | 4/2021 | Roy  | G05B 13/0265 |
| 2021/0155285 A1* | 5/2021 | Li   | B62D 5/046 |
| 2022/0058310 A1* | 2/2022 | Wang | G06F 30/20 |

* cited by examiner

EFFICIENCY OPTIMIZATION CONTROL METHOD AND SYSTEM FOR PERMANENT MAGNET SYNCHRONOUS MOTOR

TECHNICAL FIELD

The disclosure relates to the field of controlling of a permanent magnet synchronous motor, and more particularly to a composite efficiency optimization control method and system for permanent magnet synchronous motor based on a combination of a loss model algorithm and a deep reinforcement learning algorithm.

BACKGROUND

With rapid development of society economy and increasing demand for electricity, problems of energy shortages and environmental pollution have become increasingly serious. Carbon peaking achieved in 2030 and carbon neutrality achieved in 2060 are ambitious goals developed by China, and also are a solemn commitment for international community. In 2020, a proportion of an electricity consumption of a global electric motor system exceeds 50 percent (%), a proportion of the electricity consumption of an electric motor system in China has reached 64%, thus improving work efficiency of a motor plays a crucial role in alleviating global energy shortages and reducing carbon emissions.

A permanent magnet synchronous motor has advantages such as a small size and a high-power density, and the permanent magnet synchronous motor is widely applied in various industries. How to further improve an operational efficiency of the permanent magnet synchronous motor is a persistent pursuit goal of scientific researchers. Efficiency optimization control technologies for the permanent magnet synchronous motor are divided into two types: an efficiency optimization control method based on a loss model algorithm and an efficiency optimization control method based on a search technique.

The loss model algorithm is a main stream algorithm at present, the loss model algorithm constructs a maximum efficiency function of the permanent magnet synchronous motor or a minimum loss function of the permanent magnet synchronous motor, devises an excitation current and an excitation flux linkage when an optimal efficiency is achieved, and controls the excitation current and the excitation flux linkage to achieve efficiency optimization. The loss model algorithm can quickly achieve a control goal, and achieve a real-time control, however, the loss model algorithm ignores an effect of nonlinear factors such as a saturation effect on change of parameters of the permanent magnet synchronous motor, and does not consider an effect of a switching action of a driver on efficiency of the permanent magnet synchronous motor. Specifically, parameters of a direct axis (d-axis) and a quadrature axis (q-axis) of a salient pole permanent magnet synchronous motor are not equal, a process for obtaining an optimal d-axis current initial value is complex, and the loss model algorithm has a high dependence on the parameters of the permanent magnet synchronous motor, the parameters of the permanent magnet synchronous motor are changed with an operation state of the permanent magnet synchronous motor, and the parameters of the permanent magnet synchronous motor need to be online identified. Therefore, the loss model algorithm is difficult to be implemented, and often needs to be simplified in practice. There is still a deviation between an obtained value and an actual target value, and therefore merely a suboptimal efficiency control can be achieved.

The search technique can achieve global optimization of system efficiency, and is not affected by the change of the parameters of the permanent magnet synchronous motor. However, a convergence time of the search technique is long, and a convergence speed of the search technique is slow, which causes pulsation of a magnetic flux and a torque, and causes a contradiction between the convergence speed and the pulsation of the torque. When a selection of a step size of the search technique is improper, the convergence speed of the search technique will be too slowly or even convergence cannot be achieved, thereby leading to a decrease in an overall efficiency, and seriously affecting a target control effect of efficiency.

Aiming at disadvantages of the related art, it is necessary to design a novel efficiency optimization control method for permanent magnet synchronous motor to further improve the operation efficiency of the permanent magnet synchronous motor.

SUMMARY

Aiming at problems of the related art, the disclosure provides an efficiency optimization control method and system for permanent magnet synchronous motor to further improve operation efficiency of a permanent magnet synchronous motor.

Technical solutions provided in the disclosure are as follows.

In one aspect, an efficiency optimization control method for permanent magnet synchronous motor is provided, and the method includes:
- step 1: obtaining an approximate optimal direct axis (d-axis) current $i_d$ of a permanent magnet synchronous motor by using a loss model algorithm;
- step 2: performing, by using the approximate optimal d-axis current as an initial value and using a deep reinforcement learning (a deep Q-network abbreviated as DQN) algorithm, an optimizing process on the approximate optimal d-axis current to construct an optimal deep reinforcement learning model; and
- step 3: inputting currently acquired state data of the permanent magnet synchronous motor into the optimal deep reinforcement learning model to obtain a control parameter value corresponding to an optimal efficiency of the permanent magnet synchronous motor, and controlling the permanent magnet synchronous motor based on the control parameter value.

In an embodiment, the step 1 includes the following steps.

Firstly, a loss of the permanent magnet synchronous motor is analyzed to construct a loss model of the permanent magnet synchronous motor.

A total loss of the permanent magnet synchronous motor includes a mechanical loss, a copper loss and an iron loss. The mechanical loss is constantly changed with different of rotary speed and operation states, and the mechanical loss is uncontrollable. Therefore, only an electrical loss is considered in the disclosure, since the electrical loss is a controllable part, and the electrical loss includes the copper loss and the iron loss. According to a d-axis equivalent circuit of the permanent magnet synchronous motor considering the copper loss and the iron loss, and a quadrature axis (q-axis) equivalent circuit of the permanent magnet synchronous motor considering the copper loss and the iron loss, dynamic voltage equations of the permanent magnet synchronous motor are obtained, which are expressed as follows:

$$u_q = R_s i_q + L_q \frac{d}{dt} i_{wq} + n_p \omega_r (L_d i_{wd} + \psi_m);$$

$$u_d = R_s i_d + L_d \frac{d}{dt} i_{wd} - n_p \omega_r L_q i_{wq};$$

where $u_d$ represents a d-axis armature voltage, $u_q$ represents a q-axis armature voltage; $i_d$ represents a d-axis current (i.e., armature current), and $i_q$ represents a q-axis current; $i_{wd}$ represents an active component of the d-axis current, $i_{wq}$ represents an active component of a q-axis current; $R_s$ represents an armature resistance; $L_d$ represents a d-axis armature inductance, and $L_q$ represents a q-axis armature inductance; $\psi_m$ represents a magnetic linkage of a rotor; $\omega_r$ represents a mechanical angular velocity of the rotor; and $n_p$ represents a pole pair number of the permanent magnet synchronous motor.

According to an equivalent circuit voltage equation (Kirchhoff's voltage law abbreviated as KVL) of the permanent magnet synchronous motor, an iron loss component of the d-axis current and an iron loss component of the q-axis current are expressed as follows:

$$i_{Fed} = \frac{-n_p \omega_r L_q i_{wq}}{R_{Fe}};$$

$$i_{Feq} = \frac{n_p \omega_r (L_d i_{wd} + \psi_m)}{R_{Fe}};$$

where $i_{Fed}$ represents the iron loss component of the d-axis current, $i_{Feq}$ represents the iron loss component of the q-axis current, and $R_{Fe}$ represents an equivalent iron loss resistance.

According to the iron loss component of the d-axis current and the iron loss component of the q-axis current, the loss (i.e., the loss model) of the permanent magnet synchronous motor is expressed as follows:

$$P_{loss} = P_{Cu} + P_{Fe}$$
$$= \frac{3}{2} R_s (i_d^2 + i_q^2) + \frac{3}{2} R_{Fe} (i_{Fed}^2 + i_{Feq}^2)$$
$$= \frac{3}{2} R_s \left\{ \left[ \frac{T_e}{n_p \Psi_m} + \frac{n_p \omega_r (L_d i_{wd} + \Psi_m)}{R_{Fe}} \right]^2 + \left( i_{wd} - \frac{\omega_r L_q T_e}{\Psi_m R_{Fe}} \right)^2 \right\} +$$
$$\frac{3 n_p^2 \omega_r^2}{R_{Fe}} \left[ (L_d i_{wd} + \Psi_m)^2 + \left( \frac{L_q T_e}{n_p \Psi_m} \right)^2 \right]$$

where $T_e$ represents an electromagnetic torque of the permanent magnet synchronous motor.

Then, the approximate optimal d-axis current is obtained based on the loss model of the permanent magnet synchronous motor.

During steady state operation of the permanent magnet synchronous motor, a rotary speed and the electromagnetic torque of the permanent magnet synchronous motor remain constant, therefore, from expression of the loss of the permanent magnet synchronous motor, it can be seen that the loss of the permanent magnet synchronous motor is merely related to $i_{wd}$. In order to make the loss of the permanent magnet synchronous motor minimized, the following formula needs to be satisfied:

$$\frac{dP_{loss}}{di_{wd}} = 0;$$

and the active component of the d-axis current is thereby expressed as follows:

$$i_{wd} = -\frac{n_p^2 \omega_r^2 \psi_m L_d (R_s + R_{Fe})}{R_s R_{Fe}^2 + (R_s + R_{Fe}) n_p^2 \omega_r^2 L_d^2}.$$

Based on an equivalent circuit node current equation of the permanent magnet synchronous motor (Kirchhoff's current law abbreviated as KCL), the approximate optimal d-axis current is expressed as follows:

$$i_d = i_{wd} + i_{Fed};$$

and the approximate optimal d-axis current is obtained through the following expression:

$$i_d = \left( 1 + \frac{n_p^2 \omega_r^2 L_d L_q}{R_{Fe}^2} \right) \left[ -\frac{n_p^2 \omega_r^2 \Psi_m L_d (R_s + R_{Fe})}{R_s R_{Fe}^2 + (R_s + R_{Fe}) n_p^2 \omega_r^2 L_d^2} \right] + \frac{n_p^2 \omega_r^2 L_q \Psi_m}{R_{Fe}^2} - \frac{n_p \omega_r L_q}{R_{Fe}} i_q.$$

During an operation process of the permanent magnet synchronous motor, parameters of the permanent magnet synchronous motor constantly change, in a situation that the loss model algorithm is used, the obtained d-axis current is merely an approximate optimal d-axis current due to an effect of the parameters. In order to achieve the optimal efficiency control of the permanent magnet synchronous motor, the optimizing process is performed on the parameters by the deep reinforcement learning algorithm in the disclosure to thus obtain an optimal parameter for controlling the permanent magnet synchronous motor.

In an embodiment, the step 2 includes:

step 2.1: constructing a deep reinforcement learning model of an agent of the permanent magnet synchronous motor by using the deep reinforcement learning algorithm, where the deep reinforcement learning model includes a value network $Q^v$, a target network $Q^T$, a state space S, an action space A and a reward function Reward, structures of the value network $Q^v$ and the target network $Q^T$ are the same, each state in the state space S is represented as a four-dimensional vector (T,v,acc,T1), where T represents an electromagnetic torque of the permanent magnet synchronous motor, v represents a rotary speed of the permanent magnet synchronous motor, acc represents an acceleration of the permanent magnet synchronous motor; T1 represents a load torque of the permanent magnet synchronous motor, and each action in the action space A is a value of the approximate optimal d-axis current $i_d$;

step 2.2: performing, by using the deep reinforcement learning model, the optimizing process on the approximate optimal d-axis current to obtain a global optimization data pool;

step 2.3: detecting and eliminating abnormal data in the global optimization data pool; and step 2.4: training the deep reinforcement learning model based on sample data in the global optimization data pool after eliminating the abnormal data, determining whether a termination condition is satisfied, in a situation that the termination condition is satisfied, then stopping training of the deep reinforcement learning model and thereby obtaining the optimal deep reinforcement learning model; otherwise returning to and performing the step 2.2.

In an embodiment, the step 2.2 includes:

step 2.2.1: constructing a data pool D, where a capacity of the data pool D is C;

step 2.2.2: measuring a current state s of the permanent magnet synchronous motor, where the current state s includes a current electromagnetic torque, a current rotary speed, a current acceleration and a current load torque of the permanent magnet synchronous motor; recording the approximate optimal d-axis current as an action a, executing the action a, that is controlling the permanent magnet synchronous motor based on the approximate optimal d-axis current, automatically updating the current state s of the permanent magnet synchronous motor to a next state s' (the next state is a suboptimal state of the permanent magnet synchronous motor), and calculating a reward value r for executing the action a in the current state s through the reward function; and storing current sample data (s, a, r, s') in the data pool D;

step 2.2.3: assigning s' to the current state s, and inputting the current state s into the value network $Q^v$, obtaining a prediction $Q$-value of each action in the state space under the current state s by using a parameter θ of the value network $Q^v$, determining a target action by using an epsilon (ε)-greedy strategy, and recording the target action as a;

step 2.2.4: executing the target action a, that is controlling the permanent magnet synchronous motor based on the approximate optimal d-axis current, automatically updating the current state s of the permanent magnet synchronous motor to a next state s', and calculating the reward value r for executing the action a in the current state s through the reward function; and storing current sample data (s, a, r, s') in the data pool D; and step 2.2.5: executing a loop by returning to the step 2.2.3 until the data pool is full to obtain a current data pool, wherein the current data pool is used as the global optimization data pool.

The approximate optimal d-axis current is obtained by the loss model algorithm to obtain the state (includes the electromagnetic torque, the rotary speed, the acceleration and the load torque) of the permanent magnet synchronous motor, the state is a constant value, and the state is a suboptimal state of the permanent magnet synchronous motor. Further, in the disclosure, the state space S (a value range of the state) is designed, each state in the state space S includes a value of the electromagnetic torque, the rotary speed, the acceleration and the load torque of the permanent magnet synchronous motor; the operation state of the permanent magnet synchronous motor is determined by state information and the reward, and the optimizing process is performed on the approximate optimal d-axis current through the deep reinforcement learning model to promptly adjust the controlling of the permanent magnet synchronous motor, and obtain the global optimization data pool.

In an embodiment, formulas of the reward function are designed as follows:

$r(s, a) = a_1$ Reward $T(k+1) +$ $a_2$ Reward $v(k+1) + a_3$ Reward $acc(k+1) + a_4$ Reward $T1(k+1)$;

-continued

Reward $T(k+1) = -\dfrac{\partial T(k)}{\partial i_d} + T(k)^2$;

Reward $v(k+1) = -\dfrac{\partial v(k)}{\partial i_d} + v(k)^2$;

Reward $acc(k+1) = -\dfrac{\partial acc(k)}{\partial i_d} + acc(k)^2$;

Reward $T1(k+1) = -\dfrac{\partial T1(k)}{\partial i_d} + T1(k)^2$;

where T(k), v(k), acc(k) and T1(k) respectively represent an electromagnetic torque, a rotary speed, an acceleration and a load torque of the permanent magnet synchronous motor before executing the action a; T(k+1), v(k+1), acc(k+1) and T1(k+1) respectively represent an electromagnetic torque, a rotary speed, an acceleration and a load torque of the permanent magnet synchronous motor after executing the action a; $a_1$, $a_2$, $a_3$ and $a_4$ represent weight parameters of four reward factors; and r(s,a) represents the reward value for executing the action a under the current state s={T(k), v(k),acc(k),T1(k)}.

In an embodiment, the step 2.3 includes: detecting and eliminating the abnormal data in the global optimization data pool by using a density-based local outlier factor (LOF) method.

During an actual engineering, clearly illogical data is sometimes generated by a motor system, and the clearly illogical data is known as an outlier. For the search method based on the deep reinforcement learning, a result of a data-driven method will be caused a catastrophic effect whether the outlier is temporary or permanent. Real information within the data cannot be mined due to "confusion" of the abnormal data to the data-driven method.

The outlier is detected and eliminated by using the density-based local outlier factor method in the scheme. Whether a data point is an outlier is determined by the density-based local outlier factor method comparing densities of each data point and a neighborhood data point, when a density of a data point p is lower, the data point p is more likely identified as an outlier. The density is calculated by a distance between data points, the distance is farther, the density is lower, and the distance is closer, the density is higher. Since the method calculates the density by a k-th neighborhood of a data point rather than global, the method is called a "local" outlier factor method, and instead of mistakenly determining a normal data point as an outlier due to differences in data density dispersion.

In an embodiment, the step 2.3 further includes:

step 2.3.1: calculating a k-th reachable distance of each data point in a k-th distance neighborhood of a data point p for each data point p in the global optimization data pool, wherein a formula of the k-th reachable distance is expressed as follows:

$k_{reach}(o,p) = \max(d_k(o), d(o,p))$;

where $d_k(o)$ represents a k-th distance of a neighborhood point o, and d(o,p) represents a distance between the neighborhood point o and the data point p;

step 2.3.2: calculating a k-th local reachable density $p_{reach}$ (p) of each data point p, wherein a formula of the k-th local reachable density $p_{reach}$ (p) is expressed as follows:

$$p_{reach}(p) = 1 \bigg/ \left( \frac{\sum_{o \in N_k(p)} k_{reach}(o, p)}{|N_k(p)|} \right);$$

where $N_k(p)$ represents the k-th distance neighborhood of the data point p; and $|N_k(p)|$ is a module of $N_k(p)$;

step 2.3.3: calculating a k-th local outlier factor of each data point p, wherein a formula of the k-th local outlier factor of each data point p is expressed as follows:

$$LOF_k(p) = \left( \frac{\sum_{o \in N_k(p)} p_{reach}(o)}{|N_k(p)|} \right) \bigg/ p_{reach}(p);$$

step 2.3.4: analyzing the k-th local outlier factor, where in a situation that the k-th local outlier factor is smaller than 1, the data point p is not an outlier; and in a situation that the k-th local outlier factor is larger than 1, the data point p is an outlier; and step 2.3.5: eliminating the outlier.

In an embodiment, the step 2.4 includes:

step 2.4.1: initializing an iteration number t as t=1; randomly selecting n sample data from the global optimization data pool after eliminating the abnormal data; in a situation that a reward value r of each of the n sample data is larger than a set threshold, then stopping the training of the deep reinforcement learning model and currently obtaining a value network $Q^V$, wherein the currently obtained value network $Q^V$ is the optimal deep reinforcement model; otherwise performing step 2.4.2;

step 2.4.2: using the randomly selected n sample data as inputs of the value network $Q^V$ and the target network $Q^T$;

for each sample data (s, a, r, s'), obtaining a corresponding prediction $Q$-value based on the state s and the action a of the sample data (s, a, r, s'), and the parameter θ of the value network $Q^V$, recording a prediction $Q$-value corresponding to i-th sample data as $Q_{predict(i)}$, wherein i=1, 2, . . . , n;

for the each sample data (s, a, r, s'), obtaining a corresponding $Q$-value $Q(s', a', \theta^T)$ for executing an actions a' in the state space under the next state s' based on the next state s' and a parameter $\theta^T$ of the target network $Q^T$ to thereby obtain a plurality of $Q$-values, and selecting a maximum value $$\max_{a'} Q(s', a', \theta^T)$$

of the plurality of $Q$-values; and calculating a target $Q$-value $Q_{Target(i)}$ corresponding to the i-th sample data based on the maximum value $$\max_{a'} Q(s', a', \theta^T),$$

wherein a formula of the target $Q$-value $Q_{Target(i)}$ is expressed as follows:

$$Q_{Target(i)} = r_i + \gamma \max_{a'} Q(s', a', \theta^T);$$

where γ represents a reward attenuation factor, and γ is in a range of [0,1]; and $r_i$ represents a reward value of the i-th sample data;

step 2.4.3: calculating a loss function L by using the prediction $Q$-value $Q_{predict(i)}$ and the target $Q$-value $Q_{Target(i)}$, wherein a formula of the loss function L is expressed as follows:

$$L = \frac{1}{n} \sum_{i=1}^{n} (Q_{Target(i)} - Q_{predict(i)})^2;$$

step 2.4.4 minimizing the loss function L by using an error reversal method, updating the parameter θ of the value network $Q^V$ by using a gradient descent method, wherein a formula for updating the parameter θ is expressed as follows:

$$\theta = \theta - \alpha \frac{\partial L}{\partial \theta};$$

where α represents a learning law;

step 2.4.5: determining whether an equation t=K is satisfied, in a situation that the equation t=K is satisfied, updating the parameter $\theta^T$ of the target network $Q^T$ as $\theta^T = \theta$, and t=1; otherwise t=t+1; wherein K represents an update cycle of the parameter of the target network; and step 2.4.6: returning to the step 2.2.3 and performing the step 2.2.3.

In an embodiment, in the step 2.4.4, a is taken as 0.01 to minimize an effect of an error value on a new $Q$-value and have a certain effect.

In an embodiment, in the step 2.4.5, the update cycle K of the parameter of the target network is set as three simulation cycles, a new target network can be timely obtained by updating the parameter of the target network every three simulation cycles, which can avoid prolonged failure to update the target network to thus result in the $Q$-value falling into a local target at the same time.

In an embodiment, in the step 3, the control parameter value includes an optimal d-axis current and an optimal q-axis current; and the step 3 includes: predicting the optimal d-axis current making the permanent magnet synchronous motor run with the optimal efficiency based on the optimal deep reinforcement learning model; controlling the permanent magnet synchronous motor based on the optimal d-axis current, compensating a q-axis current of the permanent magnet synchronous motor based on the optimal d-axis current to thereby achieve an optimal control for efficiency of the permanent magnet synchronous motor in a steady state During the optimizing process of the permanent magnet synchronous motor, fluctuations of the rotary speed and the electromagnetic torque are caused by a change of the d-axis current, in order to keep the stable state of a control system for the permanent magnet synchronous motor, the scheme adjusts the d-axis current while compensating the q-axis current to maintain a constant torque.

A formula of an electromagnetic torque before adjusting the d-axis current is expressed as follows:

$$T_e = \frac{3}{2} n_p [\Psi_m i_q + (L_d - L_q) i_d i_q].$$

The q-axis current is adjusted as $i_q^*$ after $\Delta i_d$ changes of the d-axis current, and a formula for an adjusted electromagnetic torque is obtained as follows:

$$T_e = \frac{3}{2} n_p \left[ \Psi_m i_q^* + (L_d - L_q)(i_d + \Delta i_d) i_q^* \right].$$

The electromagnetic torque before and after adjusting are made equal, and a formula of the optimal q-axis current is obtained as follows:

$$i_q^* = \frac{\Psi_m + (L_d - L_q) i_d}{\Psi_m + (L_d - L_q)(i_d + \Delta i_d)} i_q.$$

A formula of a q-axis current variation $\Delta i_q$ is expressed as follows:

$$\Delta i_q = i_q^* - i_q = \frac{(L_d - L_q) i_d}{\Psi_m + (L_d - L_q)(i_d + \Delta i_d)} i_q \Delta i_d.$$

In another aspect, the disclosure provides an efficiency optimization control system for permanent magnet synchronous motor, and the system includes a memory and a processor, the memory is configured to store a computer program, and the computer program is configured to be executed by the processor to implement the above efficiency optimization control method for permanent magnet synchronous motor.

In an embodiment, the system further includes a data acquisition circuit, and the data acquisition circuit is configured to acquire current state data of the permanent magnet synchronous motor and input the current state data into the processor; and the current state data includes the electromagnetic torque, the rotary speed, the acceleration and the load torque of the permanent magnet synchronous motor.

The disclosure first combines the deep reinforcement learning algorithm with the loss model algorithm, and provides a new composite algorithm to solve a problem of efficiency optimization of the permanent magnet synchronous motor, and the new composite algorithm can inherit advantages of the deep reinforcement learning algorithm and the loss model algorithm, and overcome disadvantages of the deep reinforcement learning algorithm and the loss model algorithm. A drive and the permanent magnet synchronous motor are regarded as a whole in a motor loss model, and a unified efficiency optimization model is established. However, due to an effect by the parameter, the efficiency cannot reach global optimization. The deep reinforcement learning algorithm further performs the optimizing process based on the loss model algorithm, and the deep reinforcement learning algorithm can achieve the global optimization of the efficiency, and is not affected by a change of the parameters of the permanent magnet synchronous motor. However, a convergence time of the deep reinforcement learning algorithm is long, a convergence speed of the deep reinforcement learning algorithm is slow, which may cause pulsation of the magnetic flux and the torque, and causes a contradiction between the convergence speed and the pulsation of the torque. When a selection of a step size of the deep reinforcement learning algorithm is improper, the convergence speed of the deep reinforcement learning algorithm will be too slowly or convergence cannot be achieved, thereby leading to a decrease in an overall efficiency, and seriously affecting a target control effect of the efficiency.

A suboptimal efficiency d-axis current is obtained through the loss model algorithm in the disclosure, and the suboptimized efficiency d-axis current is used as a search initial value of the deep reinforcement learning, which can reduce a range for searching data, shorten the convergence time of the deep reinforcement learning algorithm, and avoid the effect of the change of the motor parameter to the result. The density-based local outlier factor method is used to avoid "confusion" of the abnormal data to the deep reinforcement learning algorithm, and the real information within data is not mined, thereby reducing an algorithm search accuracy. Meanwhile, the pulsation of the torque is caused by the deep reinforcement learning, and compensation for the q-axis current is used to reduce the pulsation of the torque and timely make the q-axis current to be optimized. Moreover, the electromagnetic torque, the rotary speed, the acceleration and the load torque obtained by the loss model method are constant values, and the disclosure combines the deep reinforcement learning, and sets the state space as a four-dimensional vector B (T, v, acc, T1), specifically, the four-dimensional vector B (T, v, acc, T1) includes the electromagnetic torque, the rotary speed, the acceleration and the load torque of the permanent magnet synchronous motor, the forward value is calculated by combining the current state to select a target action to thereby achieve an optimal control of the permanent magnet synchronous motor.

Beneficial effects are as follows.

The efficiency optimization control method for permanent magnet synchronous motor provided in the disclosure has advantages of a loss model-based efficiency optimization control method and a search technique-based efficiency optimization control method, and the method overcomes disadvantages thereof. Based on the motor loss model, the loss of the permanent magnet synchronous motor is directly obtained, a response speed of the permanent magnet synchronous motor is accelerated, and the loss model of the permanent magnet synchronous motor can be applied in various occasions. In a situation that the parameter changes, the deep reinforcement learning algorithm is introduced to make the permanent magnet synchronous motor obtain a global optimization value and achieve a real-time control of permanent magnet synchronous motor operation. The loss model algorithm is combined with the deep reinforcement learning, which can use the loss model algorithm to establish a suboptimal data pool, then perform the optimizing process on the global based on the suboptimal, the range for searching data is greatly reduced, the algorithm convergence time is shortened, and the effect of the change of the motor parameter to the result is avoided to perform the real-time target control for the permanent magnet synchronous motor.

DETAILED DESCRIPTION OF EMBODIMENTS

Figure 1:
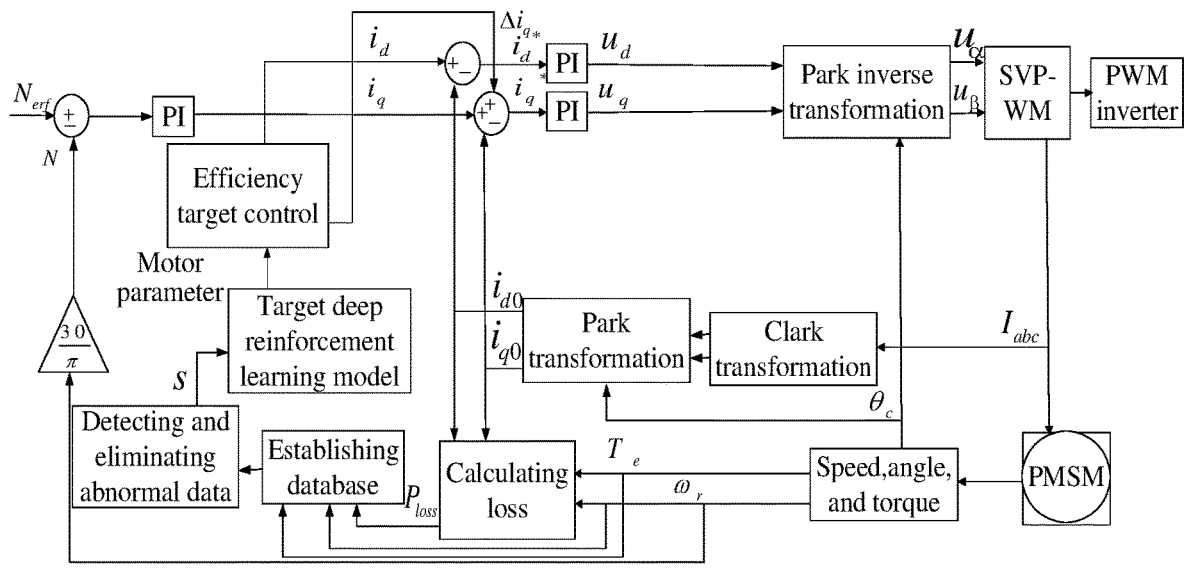
FIG. 1 illustrates a vector control block diagram of an efficiency optimization for permanent magnet synchronous motor according to an embodiment of the disclosure.

Referring to FIG. 1, the disclosure provides an efficiency optimization control method for permanent magnet synchronous motor.

The disclosure will be further described in conjunction with drawings and embodiments below.

Embodiment 1

The embodiment 1 provides an efficiency optimization control method for permanent magnet synchronous motor, and the method includes the following steps 1-3.

In step 1, an approximate optimal direct axis (d-axis) current of a permanent magnet synchronous motor is obtained by using a loss model algorithm.

In step 2, an optimizing process is performed on the approximate optimal d-axis current by using the approximate optimal d-axis current as an initial value and using a deep reinforcement learning (also referred to as a deep Q-network, which is abbreviated as DQN) algorithm, to thus construct an optimal deep reinforcement learning model.

In step 3, currently acquired state data of the permanent magnet synchronous motor is input into the optimal deep reinforcement learning model to obtain a control parameter value (i.e., an optimal d-axis current) corresponding to an optimal efficiency of the permanent magnet synchronous motor, and the permanent magnet synchronous motor is controlled based on the control parameter value.

In an embodiment, the step 1 includes the following steps.

Firstly, a loss of the permanent magnet synchronous motor is analyzed to construct the loss model of the permanent magnet synchronous motor.

Figure 2:
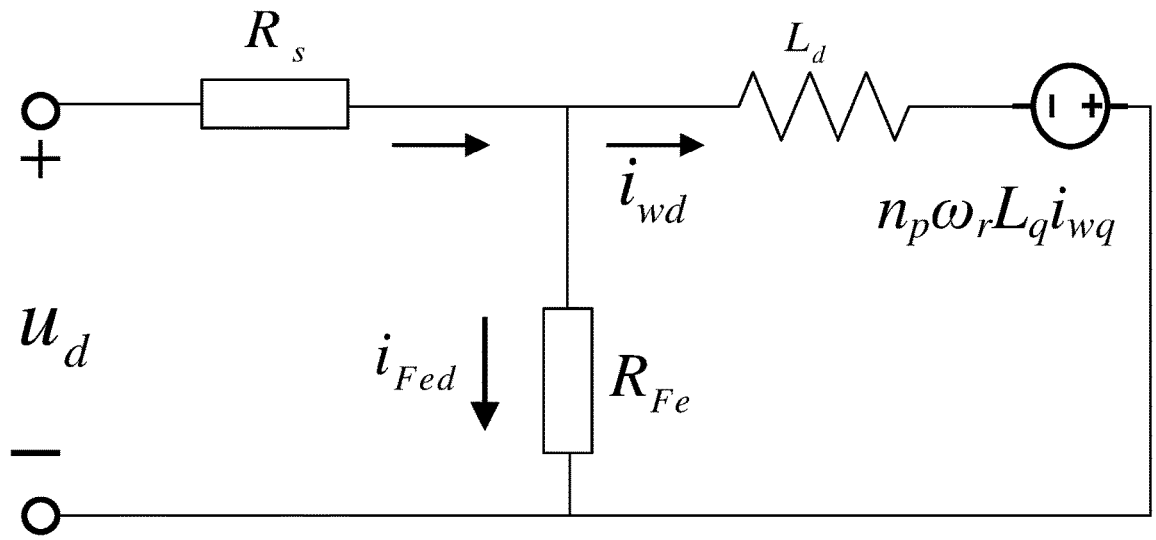
FIG. 2 illustrates a schematic diagram of a direct axis (d-axis) equivalent circuit considering an iron loss and a copper loss according to an embodiment of the disclosure.
Figure 3:
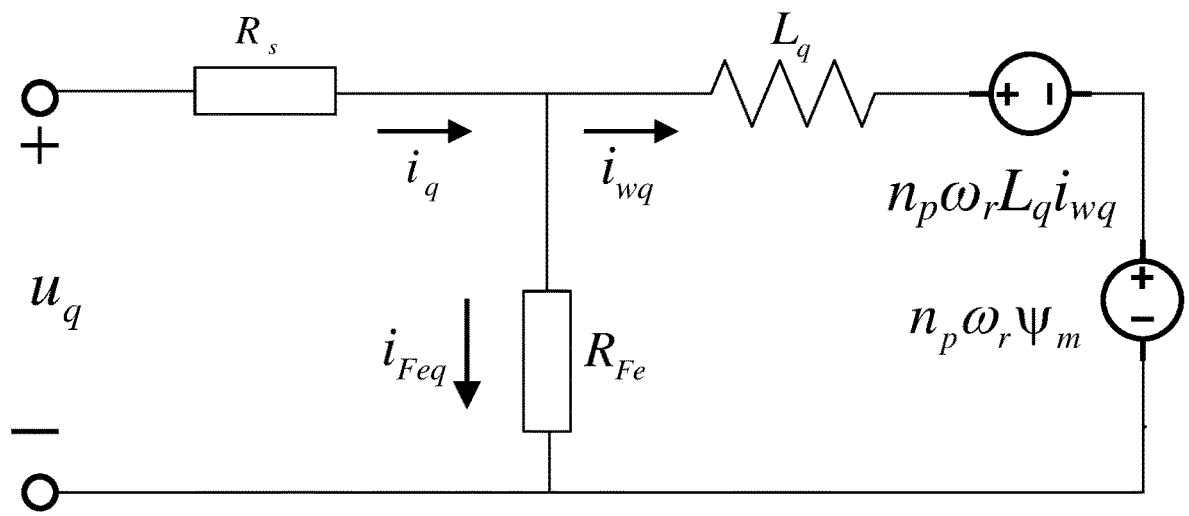
FIG. 3 illustrates a schematic diagram of a quadrature axis (q-axis) equivalent circuit considering an iron loss and a copper loss according to an embodiment of the disclosure.
Figure 4:
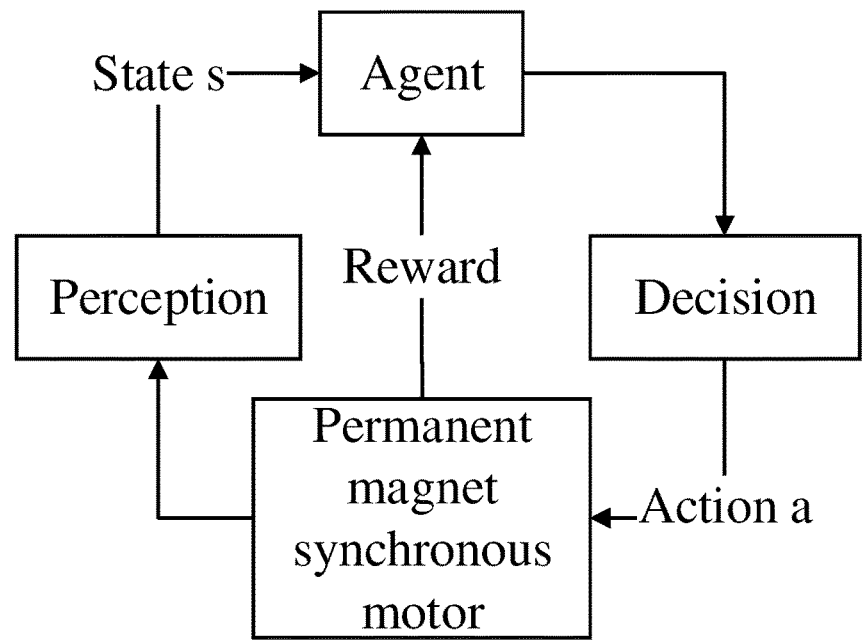
FIG. 4 illustrates a schematic diagram of a deep reinforcement learning framework of efficiency optimization of permanent magnet synchronous motor according to an embodiment of the disclosure, in which, when an action from an agent is received by a permanent magnet synchronous motor, a current state of a permanent magnet synchronous motor is automatically updated to a next state according to the action and the current state, the current state is transmitted to a reward function obtained by a target model to thus obtain a corresponding reward value, and a state vector and the reward value are input into a data pool.
Figure 5:
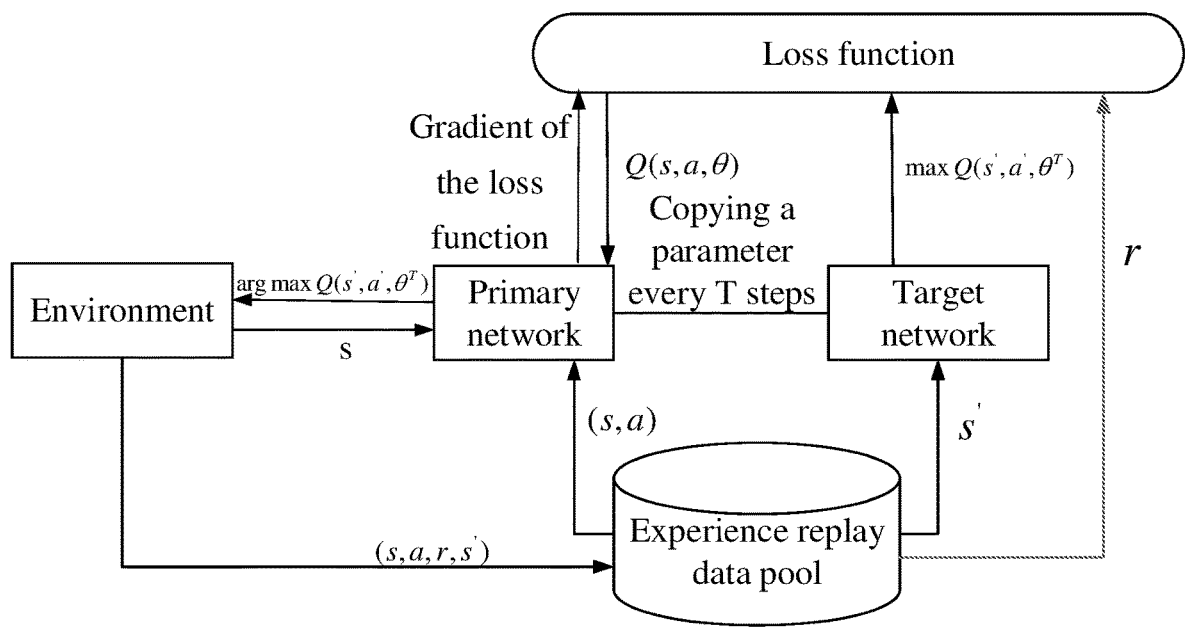
FIG. 5 illustrates a schematic diagram of a framework of a deep $Q$-network (DQN) algorithm according to an embodiment of the disclosure.

A total loss of the permanent magnet synchronous motor includes a copper loss, an iron loss, a stray loss, and a mechanical loss. The copper loss refers to a heat loss generated when current passes through a stator winding. Since a large number of coils are mounted in a stator of the permanent magnet synchronous motor, a current passing through the coils during operation is large, and thus the copper loss becomes one of main losses of the permanent magnet synchronous motor. The iron loss refers to a hysteresis and an eddy current loss generated when a magnetic flux alternately flows in an iron core of the permanent magnet synchronous motor. An amount of the iron loss depends on a material of the iron core, and is related to a current frequency and a rotary speed. Proportions of the mechanical loss and the stray loss in a total motor loss are small and difficult to control and detect. Therefore, only the iron loss and the copper loss are considered in the disclosure. According to a d-axis equivalent circuit of the permanent magnet synchronous motor considering the copper loss and the iron loss shown in FIG. 2, and a q-axis equivalent circuit of the permanent magnet synchronous motor considering the copper loss and the iron loss shown in FIG. 3, dynamic voltage equations of the permanent magnet synchronous motor are obtained, which are expressed as follows:

$$u_q = R_s i_q + L_q \frac{d}{dt} i_{wq} + n_p \omega_r (L_d i_{wd} + \psi_m);$$

$$u_d = R_s i_d + L_d \frac{d}{dt} i_{wd} - n_p \omega_r L_q i_{wq};$$

where $u_d$ represents a d-axis armature voltage, and $u_q$ represents a q-axis armature voltage; $i_d$ represents a d-axis current (i.e., armature current), and $i_q$ represents a q-axis current; $i_{wd}$ represents an active component of the d-axis current, and $i_{wq}$ represents an active component of the q-axis current; $R_s$ represents an armature resistance; $L_d$ represents a d-axis armature inductance, and $L_q$ represents a q-axis armature inductance; $\psi_m$ represents a magnetic linkage of a rotor; $\omega_r$ represents a mechanical angular velocity of the rotor; and $n_p$ represents a pole pair number of the permanent magnet synchronous motor.

According to an equivalent circuit voltage equation (Kirchhoff's voltage law abbreviated as KVL) of the permanent magnet synchronous motor, an iron loss component of the d-axis current and an iron loss component of the q-axis current are expressed as follows:

$$i_{Fed} = \frac{-n_p \omega_r L_q i_{wq}}{R_{Fe}};$$

$$i_{Feq} = \frac{n_p \omega_r (L_d i_{wd} + \psi_m)}{R_{Fe}};$$

where $i_{Fed}$ represents the iron loss component of the d-axis current, $i_{Feq}$ represents the iron loss component of the q-axis current, and $R_{Fe}$ represents an equivalent iron loss resistance.

According to the iron loss component of the d-axis current and the iron loss component of the q-axis current, the loss (i.e., the loss model) of the permanent magnet synchronous motor is expressed as follows:

$$P_{loss} = P_{Cu} + P_{Fe}$$
$$= \frac{3}{2} R_s (i_d^2 + i_q^2) + \frac{3}{2} R_{Fe}(i_{Fed}^2 + i_{Feq}^2)$$
$$= \frac{3}{2} R_s \left\{ \left[ \frac{T_e}{n_p \Psi_m} + \frac{n_p \omega_r (L_d i_{wd} + \Psi_m)}{R_{Fe}} \right]^2 + \left( i_{wd} - \frac{\omega_r L_q T_e}{\Psi_m R_{Fe}} \right)^2 \right\} +$$
$$\frac{3 n_p^2 \omega_r^2}{R_{Fe}} \left[ (L_d i_{wd} + \Psi_m)^2 + \left( \frac{L_q T_e}{n_p \Psi_m} \right)^2 \right]$$

where $T_e$ represents an electromagnetic torque of the permanent magnet synchronous motor.

Then, the approximate optimal d-axis current is obtained based on the loss model of the permanent magnet synchronous motor.

During steady state operation of the permanent magnet synchronous motor, a rotary speed and the electromagnetic torque of the permanent magnet synchronous motor remain constant, therefore, from the loss expression of the permanent magnet synchronous motor, it can be seen that the loss of the permanent magnet synchronous motor is merely related to $i_{wd}$. In order to make the loss of the permanent magnet synchronous motor minimized, the following formula needs to be satisfied:

$$\frac{dP_{loss}}{di_{wd}} = 0;$$

and the active component of the d-axis current is thereby expressed as follows:

$$i_{wd} = -\frac{n_p^2\omega_r^2\psi_m L_d(R_s + R_{Fe})}{R_s R_{Fe}^2 + (R_s + R_{Fe})n_p^2\omega_r^2 L_d^2}.$$

Based on an equivalent circuit node current equation of the permanent magnet synchronous motor (Kirchhoff's current law abbreviated as KCL), the approximate optimal d-axis current is expressed as follows:

$$i_d = i_{wd} + i_{Fed};$$

and the approximate optimal d-axis current is obtained through the following expression:

$$i_d = \left(1 + \frac{n_p^2\omega_r^2 L_d L_q}{R_{Fe}^2}\right)\left[-\frac{n_p^2\omega_r^2\psi_m L_d(R_s + R_{Fe})}{R_s R_{Fe}^2 + (R_s + R_{Fe})n_p^2\omega_r^2 L_d^2}\right] + \frac{n_p^2\omega_r^2 L_q\Psi_m}{R_{Fe}^2} - \frac{n_p\omega_r L_q}{R_{Fe}}i_q.$$

During an operation process of the permanent magnet synchronous motor, parameters of the permanent magnet synchronous motor constantly change, in a situation that the loss model algorithm is used, the obtained d-axis current is merely an approximate optimal d-axis current due to an effect of the parameters. In order to achieve the optimal efficiency control of the permanent magnet synchronous motor, the optimizing process is performed on the parameters by the deep reinforcement learning algorithm in the disclosure to thus obtain an optimal parameter for controlling the permanent magnet synchronous motor.

Embodiment 2

The embodiment 2 is based on the embodiment 1, the step 2 includes the following steps 2.1-2.4.

In step 2.1, the deep reinforcement learning algorithm is used to construct a deep reinforcement learning model of an agent of the permanent magnet synchronous motor. The deep reinforcement learning model includes a value network $Q^V$, a target network $Q^T$, a state space S, an action space A, and a reward function Reward. Structures of the value network $Q^V$ and the target network $Q^T$ are the same. Each state in the state space S is represented as a four-dimensional vector (T,v,acc,T1). Specifically, T represents an electromagnetic torque of the permanent magnet synchronous motor, v represents a rotary speed of the permanent magnet synchronous motor, acc represents an acceleration of the permanent magnet synchronous motor, and T1 represents a load torque of the permanent magnet synchronous motor. Each action in the action space A is a value of the approximate optimal d-axis current $i_d$.

In step 2.2, the optimizing process is performed on the approximate optimal d-axis current (i.e., suboptimal data) by using the deep reinforcement learning model to obtain a global optimization data pool.

In step 2.3, abnormal data in the global optimization data pool is detected and eliminated.

In step 2.4, the deep reinforcement learning model is trained based on sample data in the global optimization data pool after eliminating the abnormal data, whether a termination condition is met is determined, in a situation that the termination condition is satisfied, then training of the deep reinforcement learning model is stopped and the optimal deep reinforcement learning model is obtained; otherwise the step 2.2 is performed.

Embodiment 3

The embodiment 3 is based on the embodiment 2, the step 2.2 includes the following steps 2.2.1-2.2.5.

In step 2.2.1, a data pool D is constructed, and a capacity of the data pool D is C.

In step 2.2.2, a current state s of the permanent magnet synchronous motor is measured, and the current state includes a current electromagnetic torque, a current rotary speed, a current acceleration and a current load torque of the permanent magnet synchronous motor. The approximate optimal d-axis current is recorded as an action a, the action a is executed, that is the permanent magnet synchronous motor is controlled based on the approximate optimal d-axis current, the current state s of the permanent magnet synchronous motor is automatically updated (i.e., transmitted) to a next state s' (the next state is a suboptimal state of the permanent magnet synchronous motor), and a reward value r for executing the action a in the current state s is calculated through the reward function; and current sample data (s, a, r, s') is stored in the data pool D.

In step 2.2.3, s' is assigned to the current state s, and is input into the value network $Q^V$; a prediction $Q$-value of each action in the state space under the current state s is obtained by using a parameter θ of the value network $Q^V$; a target action is determined by using an epsilon (E)-greedy strategy, and the target action is recorded as a.

In step 2.2.4, the target action a is executed, that is the permanent magnet synchronous motor is controlled based on the approximate optimal d-axis current, the current state of the permanent magnet synchronous motor is automatically updated to a next state s', and the reward value r for executing the action a in the current state s is calculated through the reward function, and current sample data (s, a, r, s') is stored in the data pool D.

In step 2.2.5, a loop is executed by returning to the step 2.2.3 until the data pool is full (the number of the sample data in the data pool D reaches the capacity C of the data pool D), a current data pool, as the global optimization data pool, is thus obtained.

The approximate optimal d-axis current is obtained by the loss model algorithm to obtain the state (includes the electromagnetic torque, the rotary speed, the acceleration and the load torque) of the permanent magnet synchronous motor, the state is a constant value, and the state is a suboptimal state of the permanent magnet synchronous motor. Further, in the disclosure, the state space S (a value range of the state) is designed, each state in the state space S includes a value of the electromagnetic torque, the rotary speed, the acceleration and the load torque of the permanent magnet synchronous motor, the optimizing process is performed on the approximate optimal d-axis current through the deep reinforcement learning model to obtain the global optimization data pool. The obtained state of the permanent magnet synchronous motor by the loss model algorithm is used as the initial value of the deep reinforcement learning algorithm, which can reduce the number of trial and error times during a motor search process, perform a global optimizing process based on suboptimal, and significantly reduce training and learning time.

Embodiment 4

The embodiment 4 is based on the embodiment 3, the capacity C of the data pool in the step 2.2.1 is valued as 200, that is, 200 sample data can be stored in the data pool D.

Embodiment 5

The embodiment 5 is based on the embodiment 3, a formula of the reward function is designed as follows:

$$r(s, a) = a_1 \text{ Reward } T(k+1) + a_2 \text{ Reward } v(k+1) +$$
$$a_3 \text{ Reward } acc(k+1) + a_4 \text{ Reward } T1(k+1);$$

$$\text{Reward } T(k+1) = -\frac{\partial T(k)}{\partial i_d} + T(k)^2;$$

$$\text{Reward } v(k+1) = -\frac{\partial v(k)}{\partial i_d} + v(k)^2;$$

$$\text{Reward } acc(k+1) = -\frac{\partial acc(k)}{\partial i_d} + acc(k)^2;$$

$$\text{Reward } T1(k+1) = -\frac{\partial T1(k)}{\partial i_d} + T1(k)^2;$$

where $T(k)$, $v(k)$, $acc(k)$ and $T1(k)$ respectively represent an electromagnetic torque, a rotary speed, an acceleration and a load torque of the permanent magnet synchronous motor before executing the action a; $T(k+1)$, $v(k+1)$, $acc(k+1)$ and $T1(k+1)$ respectively represent an electromagnetic torque, a rotary speed, an acceleration and a load torque of the permanent magnet synchronous motor after executing the action a; $a_1$, $a_2$, $a_3$ and $a_4$ represent weight parameters of four reward factors; and $r(s,a)$ represents the reward value for executing the action a under the current state $s=\{T(k), v(k), acc(k), T1(k)\}$.

Embodiment 6

The embodiment 6 is based on the embodiment 2, in the step 2.3, the abnormal data in the global optimization data pool is detected and eliminated by using a density-based local outlier factor (LOF) method.

During an actual engineering, clearly illogical data is sometimes generated by a motor system, and the clearly illogical data is known as an outlier. For the search method based on the deep reinforcement learning, a result of a data-driven method will be caused a catastrophic effect whether the outlier is temporary or permanent. Real information within the data cannot be mined due to "confusion" of the abnormal data to the data-driven method. The outlier is detected and eliminated to mine real information within data and make the motor run more smoothly.

The outlier is detected and eliminated by using the density based local outlier factor method in the scheme. Whether a data point is an outlier is determined by the density based local outlier factor method comparing densities of each data point and a neighborhood data point, when a density of a data point p is lower, the data point p is more likely identified as an outlier. The density is calculated by a distance between data points, the distance is farther, the density is lower, and the distance is closer, the density is higher. Since the method calculates the density by a k-th neighborhood of a data point rather than global, the method is called a "local" outlier factor method, and instead of mistakenly determining a normal data point as an outlier due to differences in data density dispersion. And specific steps 2.3.1-2.3.5 are as follows.

In step 2.3.1, for each data point p in the global optimization data pool, a k-th reachable distance of each data point in a k-th distance neighborhood of the data point p is calculated, and a formula of the k-th reachable distance is expressed as follows:

$$k_{reach}(o,p) = \max(d_k(o), d(o,p));$$

where $d_k(o)$ represents a k-th distance of a neighborhood point o, and $d(o,p)$ represents a distance between the neighborhood point o and the data point p.

In step 2.3.2, a k-th local reachable density $p_{reach}(p)$ of each data point p is calculated, and a formula of the k-th local reachable density $p_{reach}(p)$ is expressed as follows:

$$p_{reach}(p) = 1 / \left( \frac{\sum_{o \in N_k(p)} k_{reach}(o, p)}{|N_k(p)|} \right);$$

where $N_k(p)$ represents the k-th distance neighborhood of the data point p, and $|N_k(p)|$ is a module of $N_k(p)$.

In step 2.3.3, a k-th local outlier factor of each data point p is calculated, and a formula of the k-th local outlier factor of each data point p is expressed as follows:

$$LOF_k(p) = \left( \frac{\sum_{o \in N_k(p)} p_{reach}(o)}{|N_k(p)|} \right) / p_{reach}(p).$$

In step 2.3.4, the k-th local outlier factor is analyzed, in a situation that the k-th local outlier factor is smaller than 1, the data point p is not an outlier, and in a situation that the k-th local outlier factor is larger than 1, the data point p is an outlier.

In step 2.3.5, the outlier is eliminated.

Embodiment 7

The embodiment 7 is based on the embodiment 3, and the step 2.4 includes the following steps 2.4.1-2.4.6.

In step 2.4.1, an iteration number t is initialized as t=1; n sample data from the global optimization data pool after eliminating the abnormal data are randomly selected; in a situation that a reward value r of each of the n sample data is larger than a set threshold, the training of the deep reinforcement learning model is stopped, and currently obtained value network $Q^V$ is the optimal deep reinforcement model; otherwise step 2.4.2 is performed.

In step 2.4.2, the randomly selected n sample data are used as inputs of the value network $Q^V$ and the target network $Q^T$.

For each sample data (s, a, r, s'), a corresponding prediction $Q$-value is obtained based on the state s and the action a of the sample data (s, a, r, s'), and the parameter θ of the value network $Q^v$. A prediction $Q$-value corresponding to i-th sample data is recorded as $Q_{predict(i)}$, and i=1, 2, . . . , n.

For the each sample data (s, a, r, s'), a corresponding $Q$-value Q(s', a', $θ^T$) for executing an action a' in the state space under the next state s' is obtained based on the next state s' and a parameter $\theta^T$ of the target network $Q^T$ to obtain multiple $Q$-values, and a maximum value $$\max_{a'} Q(s', a', \theta^T)$$

of the multiple $Q$-values is selected; a target $Q$-value $Q_{Target(i)}$ corresponding to the i-th sample data is calculated based on the maximum value $$\max_{a'} Q(s', a', \theta^T),$$

and a formula of the target $Q$-value $Q_{Target(i)}$ is expressed as follows:

$$Q_{Target(i)} = r_i + \gamma \max_{a'} Q(s', a', \theta^T);$$

where $\gamma$ represents a reward attenuation factor, and $\gamma$ is in a rage of [0,1]; and $r_i$ represents a reward value of the i-th sample data.

In step 2.4.3, a loss function L is calculated by using prediction $Q$-value $Q_{predict(i)}$ and the target $Q$-value $Q_{Target(i)}$, and a formula of the loss function L is expressed as follows:

$$L = \frac{1}{n}\sum_{i=1}^{n}(Q_{Target(i)} - Q_{predict(i)})^2.$$

In step 2.4.4, the loss function L is minimized by using an error reversal method, and the parameter $\theta$ of the value network $Q^V$ is updated by using a gradient descent method and is updated as follows:

$$\theta = \theta - \alpha \frac{\partial L}{\partial \theta};$$

where $\alpha$ is a learning law and is an empirical parameter.

In step 2.4.5, whether an equation t=K is met is determined, in a situation that the equation t=K is satisfied, the parameter $\theta^T$ of the target network $Q^T$ is updated as $\theta^T=\theta$, and t=1; otherwise t=t+1; where K represents an update cycle of the parameter of the target network.

In step 2.4.6, return to and perform step 2.2.3.

Embodiment 8

The embodiment 8 is based on the embodiment 7, in the step 2.4.4, a is taken as 0.01 to minimize an effect of an error value on a new $Q$-value and have a certain effect.

Embodiment 9

The embodiment 9 is based on the embodiment 7, in the step 2.4.5, the update cycle K of the parameter of the target network is set as three simulation cycles, a new target network can be timely obtained by updating the parameter of the target network every three simulation cycles, which can avoid prolonged failure to update the target network to thus result in the $Q$-value falling into a local target at the same time.

Embodiment 10

The embodiment 10 is based on the embodiment 2, in the step 3, the control parameter value includes an optimal d-axis current and an optimal q-axis current; real-time data currently acquired is input into the optimal deep reinforcement learning model, and the optimal d-axis current making the permanent magnet synchronous motor run with the optimal efficiency is predicted based on the optimal deep reinforcement learning model; the permanent magnet synchronous motor is controlled based on the optimal d-axis current, and a q-axis current of the permanent magnet synchronous motor is compensated based on the optimal d-axis current to thus achieve an optimal control for efficiency of the permanent magnet synchronous motor in a steady state.

The scheme is considered to be achieved in an actual motor, and efficiency optimization can be achieved by ensuring stable operation of the motor. During the optimizing process of the motor, fluctuations of the rotary speed and the electromagnetic torque are caused by a change of the d-axis current, in order to keep the stable state of a control system for the permanent magnet synchronous motor, the scheme adjusts the d-axis current while compensating the q-axis current to maintain a constant torque.

A formula of an electromagnetic torque before adjusting the d-axis current is expressed as follows:

$$T_e = \frac{3}{2}n_p[\Psi_m i_q + (L_d - L_q)i_d i_q].$$

The q-axis current is adjusted as $i_q^*$ after $\Delta i_d$ changes of the d-axis current, and a formula for an adjusted electromagnetic torque is obtained as follows:

$$T_e = \frac{3}{2}n_p[\Psi_m i_q^* + (L_d - L_q)(i_d + \Delta i_d)i_q^*].$$

The electromagnetic torque before and after adjusting are made equal, and a formula of the optimal q-axis current is obtained as follows:

$$i_q^* = \frac{\Psi_m + (L_d - L_q)i_d}{\Psi_m + (L_d - L_q)(i_d + \Delta i_d)}i_q.$$

A formula of a q-axis current variation $\Delta i_q$ is expressed as follows:

$$\Delta i_q = i_q^* - i_q = \frac{(L_d - L_q)i_d}{\Psi_m + (L_d - L_q)(i_d + \Delta i_d)}i_q \Delta i_d.$$

Embodiment 11

The disclosure provides an efficiency optimization control system for permanent magnet synchronous motor, and the system includes a memory and a processor, the memory is configured to store a computer program, and the computer program is configured to be executed by the processor to implement the above efficiency optimization control method for permanent magnet synchronous motor.

Embodiment 12

The embodiment 12 is based on the embodiment 11, the system further includes a data acquisition circuit, and the data acquisition circuit is configured to acquire current state data of the permanent magnet synchronous motor and input the current state data into the processor specifically, the current state data includes the electromagnetic torque, the rotary speed, the acceleration and the load torque of the permanent magnet synchronous motor.

The disclosure first combines the deep reinforcement learning algorithm with the loss model algorithm, and provides a new composite algorithm to solve a problem of efficiency optimization of the permanent magnet synchronous motor, and the new composite algorithm can inherit advantages of the deep reinforcement learning algorithm and the loss model algorithm, and overcome disadvantages of the deep reinforcement learning algorithm and the loss model algorithm. A drive and the permanent magnet synchronous motor are regarded as a whole in a motor loss model, and a unified efficiency optimization model is established. However, due to an effect by the parameter, the efficiency cannot reach global optimization. The deep reinforcement learning algorithm further performs the optimizing process based on the loss model algorithm, and the deep reinforcement learning algorithm can achieve the global optimization of the efficiency, and is not affected by a change of the parameters of the permanent magnet synchronous motor. However, a convergence time of the deep reinforcement learning algorithm is long, a convergence speed of the deep reinforcement learning algorithm is slow, which may cause pulsation of the magnetic flux and the torque, and causes a contradiction between the convergence speed and the pulsation of the torque. When a selection of a step size of the deep reinforcement learning algorithm is improper, the convergence speed of the deep reinforcement learning algorithm will be too slowly or convergence cannot be achieved, thereby leading to a decrease in an overall efficiency, and seriously affecting a target control effect of the efficiency.

A suboptimal efficiency d-axis current is obtained through the loss model algorithm in the disclosure, and the suboptimized efficiency d-axis current is used as a search initial value of the deep reinforcement learning, which can reduce a range for searching data, shorten the convergence time of the deep reinforcement learning algorithm, and avoid the effect of the change of the motor parameter to the result. The density-based local outlier factor method is used to avoid "confusion" of the abnormal data to the deep reinforcement learning algorithm, and the real information within data is not mined, thereby reducing an algorithm search accuracy. Meanwhile, the pulsation of the torque is caused by the deep reinforcement learning, and compensation for the q-axis current is used to reduce the pulsation of the torque and timely make the q-axis current to be optimized. Moreover, the electromagnetic torque, the rotary speed, the acceleration and the load torque obtained by the loss model method are constant values, and the disclosure combines the deep reinforcement learning, and sets the state space as a four-dimensional vector B (T, v, acc, T1), specifically, the four-dimensional vector B (T, v, acc, T1) includes the electromagnetic torque, the rotary speed, the acceleration and the load torque of the permanent magnet synchronous motor, the forward value is calculated by combining the current state to select a target action to thereby achieve an optimal control of the permanent magnet synchronous motor.

In conclusion, the disclosure provides an efficiency optimization control method and system for permanent magnet synchronous motor. During operation of the motor, the method and system can make efficiency of the motor reach global optimization with many advantages, and the advantages include a short search time, a fast convergence speed, achieved a real-time control for motor operation and applied in various occasions; thereby achieving energy conservation, emission reduction, loss reduction, and efficiency improvement. The method and system provided by the disclosure are simple, easy to understand, easy to implement, and have high accuracy, and are a feasible scheme that can effectively improve the efficiency of the permanent magnet synchronous motor.

The above is merely specific embodiments of the disclosure, but a scope of protection of the disclosure is not limited to this. Any equivalent substitutions or changes based on a technical solution and an inventive concept of the disclosure made by those skilled in the art within of scope of the disclosed technology should be covered within the scope of protection of the disclosure.

What is claimed is:

1. An efficiency optimization control method for permanent magnet synchronous motor, comprising:
    step 1: obtaining a suboptimal direct axis (d-axis) current $i_d$ of a permanent magnet synchronous motor by using a loss model algorithm;
    step 2: performing, by using the suboptimal d-axis current as an initial value and using a deep reinforcement learning algorithm, an optimizing process on the suboptimal d-axis current $i_a$ to construct an optimal deep reinforcement learning model; and
    step 3: inputting currently acquired state data of the permanent magnet synchronous motor into the optimal deep reinforcement learning model to obtain a control parameter value corresponding to an optimal efficiency of the permanent magnet synchronous motor, and controlling the permanent magnet synchronous motor based on the control parameter value;
    wherein in the step 3, the control parameter value comprises an optimal d-axis current and an optimal q-axis current; and the step 3 comprises:
    predicting the optimal d-axis current making the permanent magnet synchronous motor run with the optimal efficiency based on the optimal deep reinforcement learning model; and
    controlling the permanent magnet synchronous motor based on the optimal d-axis current, and compensating a q-axis current of the permanent magnet synchronous motor based on the optimal d-axis current to thereby achieve an optimal control for efficiency of the permanent magnet synchronous motor in a steady state, wherein a formula of a q-axis current variation $\Delta i_q$ is expressed as follows:

$$\Delta i_q = \frac{(L_d - L_q) i_d}{\Psi_m + (L_d - L_q)(i_d + \Delta i_d)} i_q \Delta i_d;$$

wherein $L_d$ represents a d-axis armature inductance, and $L_q$ represents a q-axis armature inductance; $\Psi_m$ represents a magnetic linkage of a rotor; $i_d$ represents a d-axis current before adjusting, and $\Delta i_d$ is a d-axis current variation after adjusting.

2. The efficiency optimization control method for permanent magnet synchronous motor as claimed in claim 1, wherein the step 1 comprises:

analyzing a loss of the permanent magnet synchronous motor to construct a loss model of the permanent magnet synchronous motor;

obtaining the suboptimal d-axis current based on the loss model of the permanent magnet synchronous motor.

3. The efficiency optimization control method for permanent magnet synchronous motor as claimed in claim 2, wherein the analyzing a loss of the permanent magnet synchronous motor to construct a loss model of the permanent magnet synchronous motor comprises:

obtaining dynamic voltage equations of the permanent magnet synchronous motor based on a d-axis equivalent circuit of the permanent magnet synchronous motor considering a copper loss and an iron loss and a quadrature axis (q-axis) equivalent circuit of the permanent magnet synchronous motor considering the copper loss and the iron loss, wherein the dynamic voltage equations of the permanent magnet synchronous motor are expressed as follows:

$$u_q = R_s i_q + L_q \frac{d}{dt} i_{wq} + n_p \omega_r (L_d i_{wd} + \psi_m);$$

$$u_d = R_s i_d + L_d \frac{d}{dt} i_{wd} - n_p \omega_r L_q i_{wq};$$

wherein $u_d$ represents a d-axis armature voltage, and $u_q$ represents a q-axis armature voltage; $i_d$ represents a d-axis armature current, and $i_q$ represents a q-axis armature current; $i_{wd}$ represents an active component of the d-axis current, and $i_{wq}$ represents an active component of the q-axis current; $R_s$ represents an armature resistance; $L_d$ represents the d-axis armature inductance, and $L_q$ represents the q-axis armature inductance; $\psi_m$ represents the magnetic linkage of the rotor; $w_r$ represents a mechanical angular velocity of the rotor; and $n_p$ represents a pole pair number of the permanent magnet synchronous motor;

obtaining an iron loss component of the d-axis current and an iron loss component of the q-axis current based on an equivalent circuit voltage equation of the permanent magnet synchronous motor, wherein the iron loss component of the d-axis current and the iron loss component of the q-axis current are expressed as follows:

$$i_{Fed} = \frac{-n_p \omega_r L_q i_{wq}}{R_{Fe}};$$

$$i_{Feq} = \frac{n_p \omega_r (L_d i_{wd} + \psi_m)}{R_{Fe}};$$

wherein $i_{Fed}$ represents the iron loss component of the d-axis current, $i_{Feq}$ represents the iron loss component of the q-axis current, and $R_{Fe}$ represents an equivalent iron loss resistance;

obtaining the loss model of the permanent magnet synchronous motor based on the iron loss component of the d-axis current and the iron loss component of the q-axis current, wherein the loss model of the permanent magnet synchronous motor is expressed as follows:

$$\begin{aligned} P_{loss} &= P_{Cu} + P_{Fe} \\ &= \frac{3}{2} R_s (i_d^2 + i_q^2) + \frac{3}{2} R_{Fe} (i_{Fed}^2 + i_{Feq}^2) \\ &= \frac{3}{2} R_s \left\{ \left[ \frac{T_e}{n_p \psi_m} + \frac{n_p \omega_r (L_d i_{wd} + \psi_m)}{R_{Fe}} \right]^2 + \left( i_{wd} - \frac{\omega_r L_q T_e}{\psi_m R_{Fe}} \right)^2 \right\} + \\ &\quad \frac{3 n_p^2 \omega_r^2}{R_{Fe}} \left[ (L_d i_{wd} + \psi_m)^2 + \left( \frac{L_q T_e}{n_p \psi_m} \right)^2 \right] \end{aligned}$$

wherein $T_e$ represents an electromagnetic torque of the permanent magnet synchronous motor.

4. The efficiency optimization control method for permanent magnet synchronous motor as claimed in claim 3, wherein the obtaining the suboptimal d-axis current based on the loss model of the permanent magnet synchronous motor comprises:

$$\frac{dP_{loss}}{di_{wd}} = 0,$$

obtaining the active component of the d-axis current based on a formula wherein the active component of the d-axis current is expressed as follows:

$$i_{wd} = -\frac{n_p^2 \omega_r^2 \psi_m L_d (R_s + R_{Fe})}{R_s R_{Fe}^2 + (R_s + R_{Fe}) n_p^2 \omega_r^2 L_d^2};$$

obtaining a first formula of the suboptimal d-axis current based on an equivalent circuit node current equation of the permanent magnet synchronous motor, wherein the first formula of the suboptimal d-axis current is as follows:

$i_d = i_{wd} + i_{Fed};$ obtaining a second formula of the suboptimal d-axis current based on the first formula of the suboptimal d-axis current, the active component of the d-axis current, and the iron loss component of the d-axis current, wherein the second formula of the suboptimal d-axis current is expressed as follows:

$$i_d = \left( 1 + \frac{n_p^2 \omega_r^2 L_d L_q}{R_{Fe}^2} \right) \left[ -\frac{n_p^2 \omega_r^2 \psi_m L_d (R_s + R_{Fe})}{R_s R_{Fe}^2 + (R_s + R_{Fe}) n_p^2 \omega_r^2 L_d^2} \right] + \frac{n_p^2 \omega_r^2 L_q \psi_m}{R_{Fe}^2} - \frac{n_p \omega_r L_q}{R_{Fe}} i_q.$$

5. The efficiency optimization control method for permanent magnet synchronous motor as claimed in claim 4, wherein the step 2 comprises:

step 2.1: constructing a deep reinforcement learning model, wherein the deep reinforcement learning model comprises a value network $Q^v$, a target network $Q^T$, a state space S, an action space A and a reward function Reward; structures of the value network $Q^v$ and the target network $Q^T$ are the same; each state in the state space S is represented as a four-dimensional vector (T,v,acc,Tl), where T represents an electromagnetic torque of the permanent magnet synchronous motor, v represents a rotary speed of the permanent magnet synchronous motor, acc represents an acceleration of the permanent magnet synchronous motor; Tl represents a load torque of the permanent magnet synchronous motor, and each action in the action space A is a value of the suboptimal d-axis current $i_d$;

step 2.2: performing, by using the deep reinforcement learning model, the optimizing process on the suboptimal d-axis current to obtain a global optimization data pool;

step 2.3: detecting and eliminating abnormal data in the global optimization data pool; and step 2.4: training the deep reinforcement learning model based on sample data in the global optimization data pool after eliminating the abnormal data, determining whether a termination condition is satisfied, in a situation that the termination condition is satisfied, then stopping training of the deep reinforcement learning model and thereby obtaining the optimal deep reinforcement learning model; otherwise returning to and performing the step 2.2.

6. The efficiency optimization control method for permanent magnet synchronous motor as claimed in claim 5, wherein the step 2.2 comprises:

step 2.2.1: constructing a data pool D, wherein a capacity of the data pool D is C;

step 2.2.2: measuring a current state s of the permanent magnet synchronous motor, wherein the current state s comprises a current electromagnetic torque, a current rotary speed, a current acceleration and a current load torque of the permanent magnet synchronous motor; recording the suboptimal d-axis current as an action a, executing the action a, controlling the permanent magnet synchronous motor based on the suboptimal d-axis current, automatically updating the current state s of the permanent magnet synchronous motor to a next state s', and calculating a reward value r for executing the action a in the current state s through the reward function; and storing current sample data (s,a,r,s') in the data pool D;

step 2.2.3: assigning s' to the current state s, and inputting the current state s into the value network $Q^v$, obtaining a prediction $Q$-value of each action in the state space under the current state s by using a parameter θ of the value network $Q^v$, determining a target action by using an epsilon(ε)-greedy strategy, and recording the target action as a;

step 2.2.4: executing the target action a, automatically updating the current state of the permanent magnet synchronous motor to a next state s', and calculating the reward value r for executing the action a in the current state s through the reward function; and storing current sample data (s,a,r,s') in the data pool D; and step 2.2.5: executing a loop by returning to the step 2.2.3 until the data pool is full to obtain a current data pool, wherein the current data pool is used as the global optimization data pool.

7. The efficiency optimization control method for permanent magnet synchronous motor as claimed in claim 6, wherein formulas of the reward function are designed as follow:

$r(s, a) = a_1 \text{ Reward } T(k+1) +$ $a_2 \text{ Reward } v(k+1) + a_3 \text{ Reward } acc(k+1) + a_4 \text{ Reward } T1(k+1);$ $\text{Reward } T(k+1) = -\frac{\partial T(k)}{\partial i_d} + T(k)^2;$ $\text{Reward } v(k+1) = -\frac{\partial v(k)}{\partial i_d} + v(k)^2;$ $\text{Reward } acc(k+1) = -\frac{\partial acc(k)}{\partial i_d} + acc(k)^2;$ $\text{Reward } T1(k+1) = -\frac{\partial T1(k)}{\partial i_d} + T1(k)^2;$ wherein T (k), v (k), acc (k) and T1 (k) respectively represent an electromagnetic torque, a rotary speed, an acceleration and a load torque of the permanent magnet synchronous motor before executing the action a; T(k+1), v(k+1), acc(k+1) and T1(k+1) respectively represent an electromagnetic torque, a rotary speed, an acceleration and a load torque of the permanent magnet synchronous motor after executing the action a; $a_1$, $a_2$, $a_3$ and $a_4$ represent weight parameters of four reward factors; and r(s,a) represents the reward value for executing the action a under the current state s={T(k), v(k),acc(k),T1(k)}.

8. The efficiency optimization control method for permanent magnet synchronous motor as claimed in claim 6, wherein the step 2.3 comprises:

step 2.3.1: calculating a k-th reachable distance of each data point in a k-th distance neighborhood of a data point p for each data point p in the global optimization data pool, wherein a formula of the k-th reachable distance is expressed as follows:

$k_{reach}(o,p) = \max(d_k(o), d(o,p));$ wherein $d_k(o)$ represents a k-th distance of a neighborhood point o, and d (o,p) represents a distance between the neighborhood point o and the data point p;

step 2.3.2: calculating a k-th local reachable density $p_{reach}$ (p) of each data point p, wherein a formula of the k-th local reachable density $p_{reach}(p)$ is expressed as follows:

$$p_{reach}(p) = 1 \Big/ \left( \frac{\sum_{o \in N_k(p)} k_{reach}(o, p)}{|N_k(p)|} \right);$$

wherein $N_k(p)$ represents the k-th distance neighborhood of the data point p; and $|N_k(p)|$ is a module of $N_k(p)$;

step 2.3.3: calculating a k-th local outlier factor of each data point p, wherein a formula of the k-th local outlier factor of each data point p is expressed as follows:

$$LOF_k(p) = \left( \frac{\sum_{o \in N_k(p)} p_{reach}(o)}{|N_k(p)|} \right) \Big/ p_{reach}(p);$$

step 2.3.4: analyzing the k-th local outlier factor, where in a situation that the k-th local outlier factor is smaller than 1, the data point p is not an outlier; and in a situation that the k-th local outlier factor is larger than 1, the data point p is an outlier; and step 2.3.5: eliminating the outlier.

9. The efficiency optimization control method for permanent magnet synchronous motor as claimed in claim 8, wherein the step 2.4 comprises:

step 2.4.1: initializing an iteration number t as t=1; randomly selecting n sample data from the global optimization data pool after eliminating the abnormal data; in a situation that a reward value r of each of the n sample data is larger than a set threshold, then stopping the training of the deep reinforcement learning model and obtaining a value network $Q^v$, wherein currently obtained value network Qu is the optimal deep reinforcement model; otherwise performing step 2.4.2;

step 2.4.2: using the randomly selected n sample data as inputs of the value network $Q^v$ and the target network $Q^T$;

for each sample data (s,a,r,s'), obtaining a corresponding prediction Q-value based on the current state s and the action a of the sample data (s,a,r,s'), and the parameter θ of the value network $Q^v$, recording a prediction $Q$-value corresponding to i-th sample data as $Q_{predict\,(i)}$, wherein i=1,2, . . . , n;

for the each sample data (s,a,r,s'), obtaining a corresponding Q-value Q(s', a', $θ^T$) for executing an actions a' in the state space under the next state s' based on the next state s' and a parameter $θ^T$ of the target network $Q^T$ to thereby obtain a plurality of $Q$-values, and selecting a maximum value $$\max_{a'} Q(s', a', θ^T)$$

of the plurality of $Q$-values; and calculating a target $Q$-value $Q_{Target(i)}$ corresponding to the i-th sample data based on the maximum value $$\max_{a'} Q(s', a', θ^T),$$

wherein a formula of the target $Q$-value $Q_{Target(i)}$ is expressed as follows:

$$Q_{Target(i)} = r_i + γ \max_{a'} Q(s', a', θ^T);$$

wherein γ represents a reward attenuation factor, and γ is in a range of [0,1]; and $r_i$ represents a reward value of the i-th sample data;

step 2.4.3: calculating a loss function L by using the prediction $Q$-value $Q_{predict(i)}$ and the target $Q$-value $Q_{Target(i)}$, wherein a formula of the loss function L is expressed as follows:

$$L = \frac{1}{n} \sum_{i=1}^{n} (Q_{Target(i)} - Q_{predict(i)})^2;$$

step 2.4.4: minimizing the loss function L by using an error reversal method, updating the parameter θ of the value network $Q^v$ by using a gradient descent method, wherein a formula for updating the parameter θ is expressed as follows:

$$θ = θ - α\frac{\partial L}{\partial θ};$$

wherein α represents a learning law;

step 2.4.5: determining whether an equation t=K is satisfied, in a situation that the equation t=K is satisfied, updating the parameter $θ^T$ of the target network $Q^T$ as $θ^T$=θ, and t=1; otherwise t=t+1; wherein K represents an update cycle of the parameter of the target network; and step 2.4.6: returning to and performing the step 2.2.3.

10. The efficiency optimization control method for permanent magnet synchronous motor as claimed in claim 9, wherein in the step 2.4.4, α is taken as 0.01.

11. The efficiency optimization control method for permanent magnet synchronous motor as claimed in claim 9, wherein in the step 2.4.5, the update cycle K of the parameter of the target network is set as three simulation cycles.

12. An efficiency optimization control system for permanent magnet synchronous motor, comprising a memory and a processor, wherein the memory is configured to store a computer program, and the processor is configured to execute algorithms as claimed in claim 1.

13. An efficiency optimization control system for permanent magnet synchronous motor, comprising a memory and a processor, wherein the memory is configured to store a computer program, and the computer program is configured to be executed by the:

obtain a suboptimal direct axis (d-axis) current $i_d$ of a permanent magnet synchronous motor by using a loss model algorithm;

perform, by using the suboptimal d-axis current as an initial value and using a deep reinforcement learning algorithm, an optimizing process on the suboptimal d-axis current $i_d$ to construct an optimal deep reinforcement learning model;

predict the optimal d-axis current making the permanent magnet synchronous motor run with the optimal efficiency based on the optimal deep reinforcement learning model; and control the permanent magnet synchronous motor based on the optimal d-axis current, and compensate a q-axis current of the permanent magnet synchronous motor based on the optimal d-axis current to thereby achieve an optimal control for efficiency of the permanent magnet synchronous motor in a steady state, wherein a formula of a q-axis current variation $\Delta i_q$ is expressed as follows:

$$\Delta i_q = \frac{(L_d - L_q)i_d}{\Psi_m + (L_d - L_q)(i_d + \Delta i_d)} i_q \Delta i_d;$$

wherein $L_d$ represents a d-axis armature inductance, and $L_1$ represents a q-axis armature inductance; $\psi_m$ represents a magnetic linkage of a rotor: $i_d$ represents a d-axis current before adjusting, and $\Delta i_d$ is a d-axis current variation after adjusting.

14. The efficiency optimization control system for permanent magnet synchronous motor as claimed in claim 13, wherein the system further comprises: a data acquisition circuit, configured to acquire current state data of the permanent magnet synchronous motor and input the current state data into the processor;

wherein the current state data comprises a current electromagnetic torque, a current rotary speed, a current acceleration and a current load torque of the permanent magnet synchronous motor.

* * * * *